(12) United States Patent
Spaulding (10) Patent No.: US 7,900,366 B2
(45) Date of Patent: Mar. 8, 2011

(54) ILLUMINATED LEVEL (75) Inventor: James Spaulding, Bristol, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 26 days.

(21) Appl. No.: 12/399,849

(22) Filed: Mar. 6, 2009

(65) Prior Publication Data

US 2009/0235544 A1    Sep. 24, 2009

Related U.S. Application Data (60) Provisional application No. 61/034,530, filed on Mar. 7, 2008.

(51) Int. Cl.
G01C 9/32 (2006.01)

(52) U.S. Cl. ............. 33/348.2; 33/348; 33/379; 362/26; 362/577

(58) Field of Classification Search .............. 33/348, 33/348.2, 354, 365, 377, 379, 381, 390, 451, 33/286, 483–485, 492, 493, DIG. 21; 362/26, 362/27, 577
See application file for complete search history.

(56) References Cited

U.S. PATENT DOCUMENTS

| 2,563,191 | A | * | 8/1951 | Russ ........................... 250/462.1 |
| 2,615,122 | A | * | 10/1952 | Coombs ...................... 33/348.2 |
| 2,939,947 | A | * | 6/1960 | Schultz ....................... 33/348.2 |
| 3,673,697 | A | | 7/1972 | Wasson |
| 4,075,467 | A | * | 2/1978 | Peterson ....................... 362/602 |
| 4,407,075 | A | | 10/1983 | MacDermott et al. |
| 5,020,232 | A | | 6/1991 | Whiteford |
| 5,025,567 | A | | 6/1991 | McWilliams et al. |
| 5,075,978 | A | * | 12/1991 | Crowe ......................... 33/348.2 |
| 5,180,221 | A | | 1/1993 | Yoder |
| 5,199,177 | A | | 4/1993 | Hutchins et al. |
| 5,361,503 | A | | 11/1994 | Anderson |
| 5,561,911 | A | | 10/1996 | Martin |
| 6,203,168 | B1 | * | 3/2001 | Bahar et al. ................... 362/153 |
| 6,502,319 | B1 | * | 1/2003 | Goodrich et al. .............. 33/286 |
| 6,851,200 | B2 | | 2/2005 | Tan et al. |
| 7,134,214 | B1 | * | 11/2006 | Manning ........................ 33/483 |
| 7,243,435 | B2 | | 7/2007 | Morrissey et al. |
| 7,631,437 | B2 | * | 12/2009 | Sanderson ...................... 33/494 |
| 2003/0005592 | A1 | | 1/2003 | Wang |
| 2005/0283987 | A1 | * | 12/2005 | Nash .............................. 33/286 |

FOREIGN PATENT DOCUMENTS

| DE | 3901910 | 1/1990 |
| EP | 0971206 | 1/2000 |
| GB | 2162947 | 2/1986 |
| GB | 2259570 | 3/1993 |

* cited by examiner

Primary Examiner — Amy Cohen Johnson
(74) Attorney, Agent, or Firm — Pillsbury Winthrop Shaw Pittman LLP (57) ABSTRACT A longitudinally-elongated, hand-held level includes a body having a reference surface, a longitudinally-extending corner adjacent the reference surface, and a plurality of bubble vials for indicating an orientation of the reference surface. One or more battery-powered lights (e.g., LEDs) create a longitudinally elongated light emitting region along the corner to illuminate a longitudinally-elongated area that is adjacent to the level for use in low-light environments. The light(s) may project light through a light guide and/or light diffuser(s) extending along the corner to disperse light along the longitudinal extent of the level. The light(s) may also illuminate the corner(s) of the level and/or the bubble vials to enhance use in low-light environments.

21 Claims, 7 Drawing Sheets

ILLUMINATED LEVEL

CROSS REFERENCE

This application claims the benefit of priority from U.S. Provisional Application Ser. No. 61/034,530, titled "ILLUMINATED LEVEL," filed Mar. 7, 2008, the entire contents of which are hereby incorporated herein by reference.

BACKGROUND OF THE INVENTION

1. Field of the Invention

The present invention relates generally to hand-held levels for determining an angular orientation of a surface, and relates more specifically to lights mounted to such levels.

2. Description of Related Art

Levels are typically used in the construction industry to determine an angular orientation of a surface against which the level is placed. Such levels typically include bubble/spirit vials that are oriented at predetermined angles relative to the level's reference surfaces (e.g., 0 degrees, 45 degrees, 90 degrees, etc.).

Such levels are frequently used in dimly light environments (e.g., unfinished buildings without sufficient lights; outdoors at dusk, dawn, or night), which make it difficult to use such levels. To improve levels' usefulness in such dimly lit environments, it is known to use light sources inside a level to illuminate the inside of a level's bubble vial. Such illumination makes it easier for a user to determine the position of the bubble within the vial.

SUMMARY OF EMBODIMENTS OF THE INVENTION

While illuminated bubble vials make it easier to see the bubble in the vial in dimly lit areas, there remains a need to illuminate the surface being measured and/or the level, itself. Such illumination may, for example, help the user to confirm whether the level is flush against the surface, identify unevenness in the surface being measured, etc.

One or more embodiments of the present invention provides a hand-held level that includes a body having a reference surface, a corner adjacent the reference surface, and an orientation indicator (e.g., at least one bubble vial) connected to the body. The orientation indicator is positioned to indicate an orientation of the reference surface. The level also includes a light source (e.g., one or more LEDs) and a light emitting region disposed along the corner. The light source may be positioned to project light through the light emitting region to an area that is adjacent to the level.

According to a further aspect of one or more of these embodiments, the body is longitudinally elongated; the corner is longitudinally elongated; and the light emitting region extends longitudinally along at least 25% of a longitudinal length of the level. The light source may be positioned to illuminate a longitudinally elongated portion of the corner.

According to a further aspect of one or more of these embodiments, the level further includes a longitudinally elongated light guide (e.g., an acrylic rod) that extends along the corner. The light guide is positioned to disperse light from the light source such that light from the light source projects laterally away from the light guide over a longitudinally elongated portion of the level. The light source may be positioned to direct light into a longitudinal end of the light guide. The body may include a longitudinally elongated notch along the corner, and the light guide may be disposed in the notch.

According to a further aspect of one or more of these embodiments, the light emitting region extends longitudinally along at least 50% of a longitudinal length of the level.

According to a further aspect of one or more of these embodiments, the level also includes a battery holder mounted to the body, and an on/off switch mounted to the body and electrically connecting the battery holder to the light source.

According to a further aspect of one or more of these embodiments, the light source is positioned to illuminate the orientation indicator.

According to a further aspect of one or more of these embodiments, the light emitting region is positioned to project light from the light source to an area immediately adjacent to the level.

According to a further aspect of one or more of these embodiments, the level includes length measurement indicia (e.g., ruler markings and numbers), wherein the light source is positioned to illuminate the length measurement indicia.

One or more embodiments of the present invention provides a hand-held level that includes a longitudinally-elongated body having a reference surface, and an orientation indicator connected to the body. The orientation indicator is positioned to indicate an orientation of the reference surface. The level also includes a light source, and a longitudinally-elongated light emitting region extending longitudinally along the body. The light source may be positioned to project light through the light emitting region to an area that is adjacent to the level. The light emitting region may extend longitudinally along at least 25%, 50%, and/or 6 longitudinal inches, or more of a longitudinal length of the level. The body may include a corner adjacent the reference surface, and the light emitting region may extend longitudinally along the corner. The light emitting region may be positioned to project light from the light source to a longitudinally-elongated area immediately adjacent to the level. The light emitting region may be positioned to direct all light emitted from the light emitting region toward a plane defined by the reference surface.

One or more embodiments of the present invention provides a hand-held level that includes a body having a reference surface, and an orientation indicator connected to the body. The orientation indicator is positioned to indicate an orientation of the reference surface. The level also includes a light source mounted to the body, and a light emitting region positioned to project light from the light source to an area immediately adjacent to the level.

One or more embodiments of the present invention provides a method of using a hand-held level. The method includes disposing a reference surface of the level against a surface of an object; projecting a light beam from a corner of the level that is adjacent to the reference surface to an area of the surface of the object that is adjacent to the level; and using the orientation indicator of the level to determine an orientation of the surface of the object. The body and corner may be longitudinally elongated. Projecting the light beam may include projecting the light beam from a longitudinally elongated light emitting region disposed along the corner.

According to a further aspect of one or more of these embodiments, projecting the light beam includes projecting the light beam through a longitudinally elongated light guide that extends along the corner such that the light guide disperses the light beam laterally away from the light guide to the area over a longitudinally extending portion of the level.

According to a further aspect of one or more of these embodiments, projecting the light beam includes projecting the light beam from a battery-powered light source mounted to the level.

According to a further aspect of one or more of these embodiments, the area is immediately adjacent to the level such that projecting the light beam illuminates the area immediately adjacent to the level.

One or more embodiments of the present invention provides a method of using a hand-held level. The method includes disposing a longitudinally-elongated reference surface of a longitudinally-elongated level against a surface of an object; projecting a light beam from a longitudinally-elongated light emitting region on the level; and using the orientation indicator of the level to determine an orientation of the surface of the object. Projecting the light beam may include projecting the light beam over a longitudinally-elongated area immediately adjacent to the level.

Additional and/or alternative objects, features, aspects, and advantages of the present invention will become apparent from the following description, the accompanying drawings, and the appended claims.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

FIGS. 1-4 illustrate a level 10 according to an embodiment of the present invention. The level 10 includes a body 20, a plurality of bubble vials 30, a battery holder 40, an on/off switch 50, a light source 60, and a light guide 70.

Figure 2:
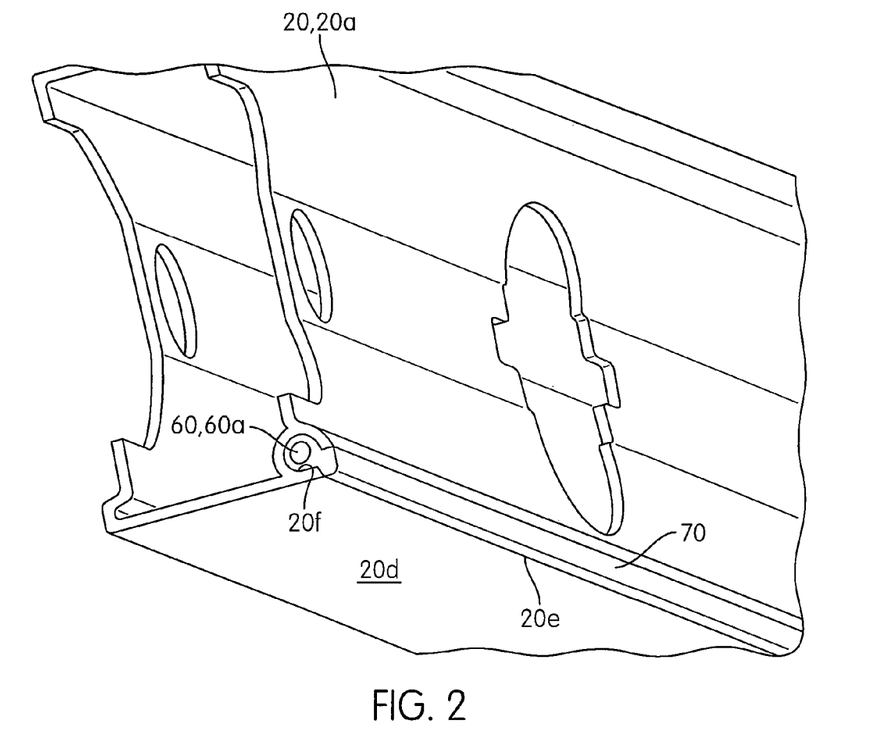
FIG. 2 is a perspective view of a portion of the level in FIG. 1.

The body 20 comprises a longitudinally elongated, hollow, extruded frame 20a (see FIG. 2), two end caps 20b mounted to the frame 20a to enclose the hollow frame 20a, and a handle insert 20c mounted to the frame 20a to provide a convenient handle for the level 10. The body 20 forms a generally-planar, longitudinally-elongated, reference surface 20d (see FIG. 2) with an outer, longitudinally-elongated, corner 20e (see FIG. 2) formed at an intersection between the surface 20d and a side surface of the body 20. The frame 20a may comprise any suitable material (e.g., wood, extruded aluminum, extruded plastic, molded metal or plastic, etc.). As best illustrated in FIG. 2, a longitudinally-elongated notch 20f extends along the corner 20e. While the body 20 of the level 10 comprises particular structures in the illustrated embodiment, any other suitable structure may alternatively be used for the body (e.g., a solid piece of wood, etc.).

Figure 1:
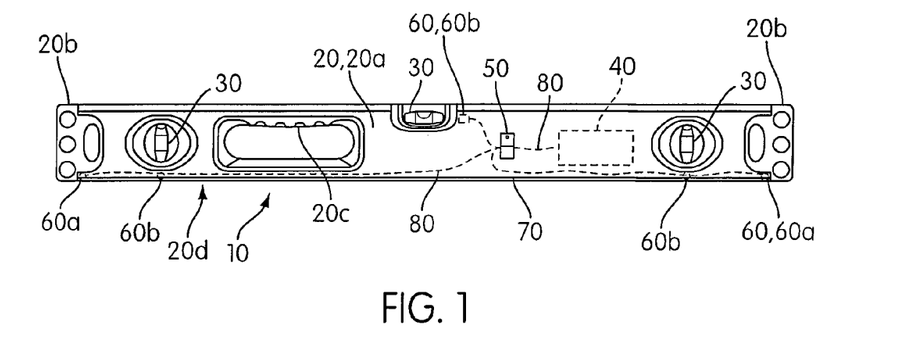
FIG. 1 is a side view of a level according to an embodiment of the present invention.

The illustrated body 20 comprises a box beam body that has a generally rectangular cross-sectional shape. However, the body 20 may alternatively comprise any other suitable shape. For example, the body 20 may comprise an I-beam shape. In an I-beam embodiment, the corner would be formed at the intersection between the reference surface and the adjacent side flange (e.g., the short vertical side that is laterally outward of the main central vertical portion of the I shape).

The bubble vials 30 comprise conventional bulging, liquid/spirit filled vials that each have a bubble therein. The bubble indicates the orientation of the longitudinal axis of the vial 30 relative to horizontal (e.g., level, somewhat level, substantially unlevel). The vials 30 mount to the body 20 such that the longitudinal axes of the vials 30 are in predetermined orientations relative to a plane defined by the reference surface 20d (e.g., parallel to, perpendicular to, at a 45 degree angle to). While the illustrated embodiment utilizes bubble vials 30 to indicate the orientation of the reference surface 20d, any other type of suitable orientation indicator may be used without deviating from the scope of the present invention (e.g., bubble/spirit hemisphere; ball within a vial, pendulum, plum bob, etc.).

The battery holder 40 is constructed to house and retain a suitable battery or batteries (e.g., three AAA batteries, a 9 volt battery, a plurality of watch batteries, etc.) for powering the light source 60. In the illustrated embodiment, the battery holder 40 is disposed within the body 20 and is accessible via a selectively openable door in the side of the frame 20a. Alternatively, the battery holder 40 may be accessible via the selective removability of one of the end caps 20b. In the illustrated embodiment, the battery holder 40 is designed to hold replaceable batteries. However, the battery holder 40 may alternatively comprise a single use battery holder in which an initial battery or batteries are permanently attached thereto (e.g., via soldering).

According to an alternative embodiment, the battery holder 40 and on/off switch 50 are incorporated into a selectively removable unit in the form of an end cap of the level. The combined unit may be selectively removable via any suitable mechanism (e.g., push button retainer; screw(s); etc.). The unit may be electrically connected to the light source 60 via flexible wires that remain connected to the unit and the remainder of the level even when the unit is removed. Alternatively, the unit may include electrical contacts that contact corresponding electrical contacts of the level when the unit is attached to the level (e.g., two metal contacts on the unit that contact two metal solder contacts on the level such as metal solder contacts on a board like the strip 570 discussed below). A metal body of a level, itself, may form one or more of the contacts. Moreover, more than two contacts/wires may be utilized depending on what signals are to be sent between the unit and the remainder of the level (e.g., three or more contacts/wires if two or more discrete parts of the light source 60 are to be turned on and off non-simultaneously (e.g., serially, separately, etc.) in an embodiment where the on/off switch 50 is part of the unit as opposed to being separately attached to the remainder of the level).

The on/off switch 50 mounts to the body 20 at any suitable location. The switch 50 electrically connects battery leads of the battery holder 40 to the light source 60a, 60b via suitable wires 80 and/or other electrical conductors (e.g., the body 20 itself if the body 20 is electrically conductive). The wires 80 extend within the frame 20a between the battery holder 40, switch 50, and light source 60. The illustrated switch 50 comprises an on/off rocker switch that electrically connects the batteries of the battery holder 40 to the light source 60 when in its ON position, and disconnects the batteries from the light source 60 when in its OFF position. While the illustrated switch 50 comprises a rocker switch, any other suitable switch may be used without deviating from the scope of the present invention (e.g., a push on/push off switch, a momentary switch, etc.).

Alternatively, the switch 50 and/or an additional electric control circuit may perform additional functions such as selectively turning on specific combinations of lights 60a, 60b within the light source 60, varying an intensity of the light source 60, automatically turning the light source 60 off after a predetermined period of inactivity in order to conserve battery life, etc.

As best illustrated in FIG. 2, the light source 60 comprises a light emitting diode (LED) 60a disposed at and aimed into the longitudinal end of the light guide 70. As illustrated in FIG. 1, the light source 60 may also include a second LED 60a disposed at and aimed into an opposite longitudinal end of the light guide 70 in order to illuminate longer light guides 70. Similarly, the light source 60 may include additional LEDs 60a disposed in the body 20 and aimed laterally toward the light guide 70 (e.g., toward a longitudinal middle of the light guide 70) to increase a light intensity over the longitudinal length of the light guide 70.

As shown in FIG. 1, the light source 60 also includes additional LEDs 60b disposed in the body 20 and aimed toward the bubble vials 30 to illuminate the bubble vials 30, as is disclosed in, for example, U.S. Pat. No. 5,199,177, the entire contents of which are hereby incorporated herein by reference. The LEDs 60b may be adhered directly to the bubble vials 30, or may be adhered to a portion of the body 20 adjacent the bubble vials 30 and aimed at the bubble vials 30.

Figure 3:
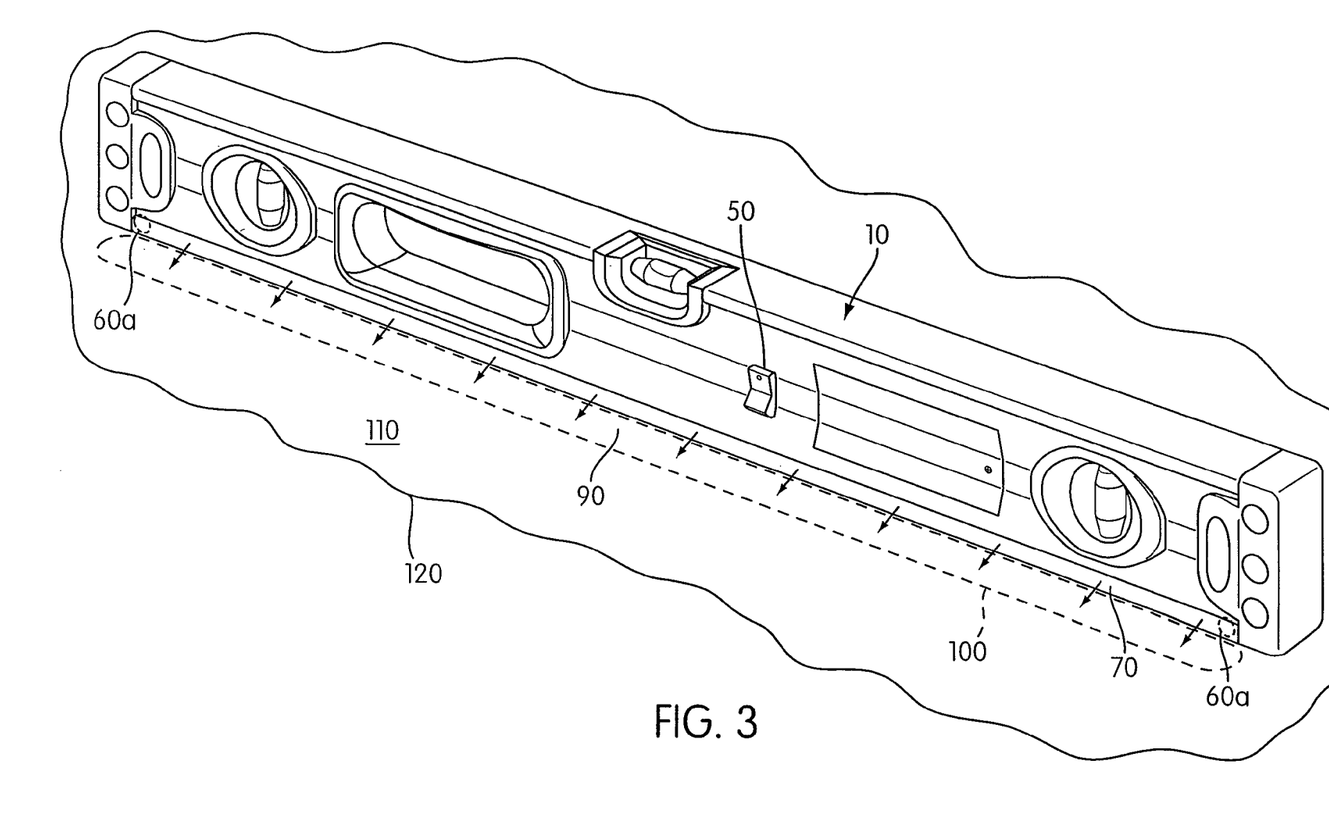
FIG. 3 is a perspective view of the level of FIG. 1 resting on a surface of an object to be measured.
Figure 4:
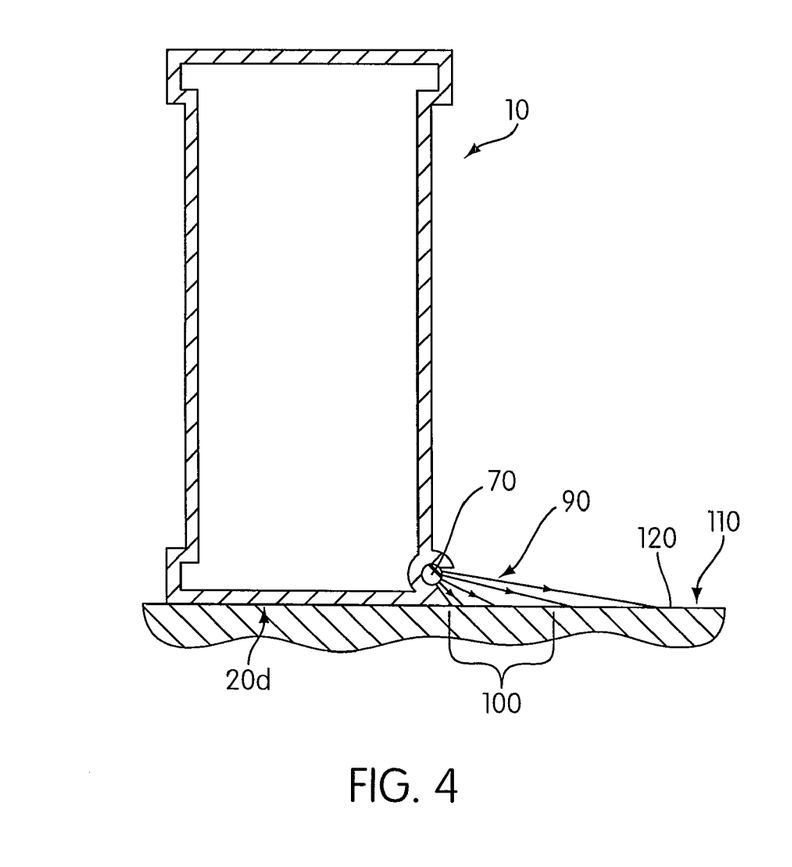
FIG. 4 is a schematic end view of the level of FIG. 1 resting on a surface of an object to be measured.

The illustrated light guide 70 comprises a longitudinally-elongated, side emitting fiber optic rod that is slid into the notch 20f in the body 20 of the level 10 such that the light guide 70 is disposed along the corner 20e of the body 20. The illustrated light guide 70 has a square cross-section, but may alternatively have any other type of suitable cross-sectional shape without deviating from the scope of the present invention (e.g., circular, square, polygonal, etc.). The light guide 70 may have a shape (e.g., prism) and the light source 60 may be positioned and oriented so as to direct and focus light in particular directions (e.g., downwardly toward a surface 110 of an object 120 to be measured). The light guide 70 comprises a material such as acrylic or glass that transmits light along its longitudinal length from the LEDs 60a while diffusing light laterally outwardly. Consequently, as illustrated in FIGS. 3 and 4, the LEDs 60a and light guide 70 work together to laterally project a light beam 90 into an area 100 that is immediately adjacent to the level 10, corner 20e, and notch 20f and that lies in a plane defined by the reference surface 20d. When the reference surface 20d abuts a surface 110 of an object 120 to be measured, the light beam illuminates the portion of the surface 110 in the area 100.

As illustrated in FIGS. 3 and 4, the notch 20f, light guide 70, and light source 60 are positioned and oriented relative to each other so as to project all light emitted from the light guide 70 downwardly toward a plane defined by the reference surface 20d. This plane is coplanar with the surface 110 of the object 120 if the surface 110 is generally planar. As best illustrated in FIG. 4, the notch 20f or another part of the body 20 may define a shield that prevents emitted light from projecting upwardly (i.e., away from the planar surface 110). Because the user's eyes are typically further away from the object 120 than the level 10, minimizing and/or preventing light from projecting away from the plane defined by the reference surface 20d may help to avoid shining light into the user's eyes, which could disadvantageously impair the user's vision in dimly lit environments. Alternatively, the emitted light may project in any other suitable direction, including upwardly.

As illustrated in FIG. 3, the light guide 70 and light source 60 create a light emitting region that extends over substantially the entire longitudinal length of the level 10 such that the light beam and illuminated area 100 likewise extend over substantially the entire longitudinal length of the level 10. However, according to alternative embodiments, the light guide 70, light beam, light emitting region, and illuminated area 100 may extend over a smaller longitudinal length (e.g., at least 5%, 15%, 25%, 35%, 50%, 75%, or 90% of the longitudinal length of the level 10; up to 100% of the longitudinal length of the level 10). The longitudinal length of the level 10, in turn, may be any suitable length (e.g., at least 6, 12, 18, 24, 36, 48, 60, or 72 inches; up to 10 feet, 8 feet, 7 feet, or 6 feet), which yields a large variety of absolute lengths for the light guide 70, light beam, light emitting region, and illuminated area (e.g., at least 4, 6, 8, 10, 12 inches). In the illustrated level 10, the light guide 70, light beam, light emitting region, and illuminated area 100 are longitudinally continuous. However, according to an alternative embodiment, the light guide 70, light beam, light emitting region, and illuminated area 100 are discontinuous. In the case of such discontinuity, the longitudinal length of the light guide 70, light beam, light emitting region, and illuminated area 100 may be calculated by summing together the individual longitudinal lengths.

The LEDs 60a and light guide 70 may also illuminate the notch 20f and corner 20e to make the level 10, itself, more visible in dimly lit environments. To facilitate such illumination, the surface of the notch 20f and/or corner 20e may have a texture and/or color that is adapted to be illuminated. Additionally and/or alternatively, the notch 20f (or portions thereof) may have a texture and/or color that is adapted to reflect light back toward the area 100 (e.g., mirrored surface, shiny metallic surface, etc.). Similarly, an inner facing portion of the light guide 70, itself, may be coated with a reflective coating to direct more light toward the area 100. Such a reflective coating may also be used to control the height of the light beam (e.g., to ensure that the light beam aims toward the surface 110 and does not aim upwardly toward the eyes of a user).

Figure 5:
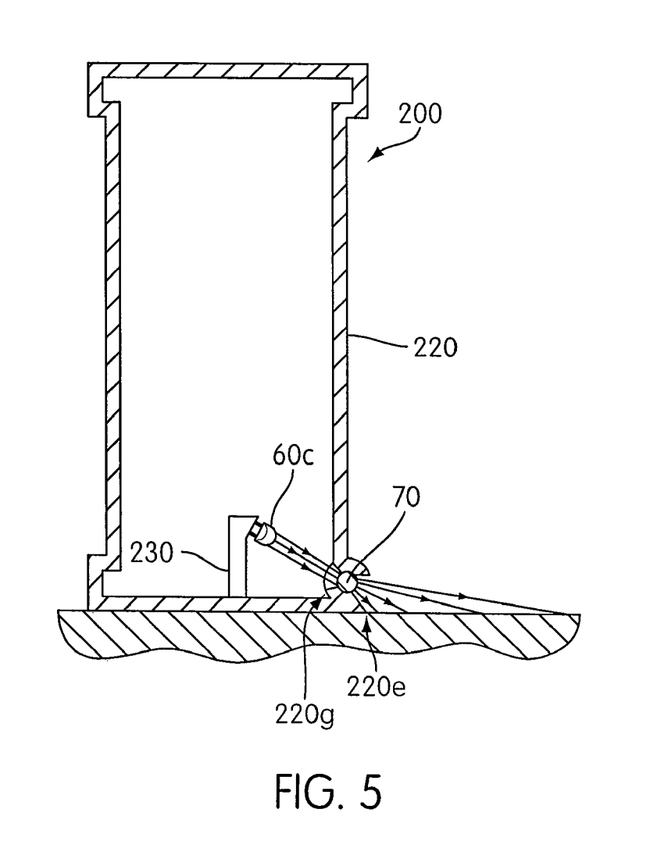
FIG. 5 is a schematic end view of a level according to an alternative embodiment of the present invention.
Figure 6:
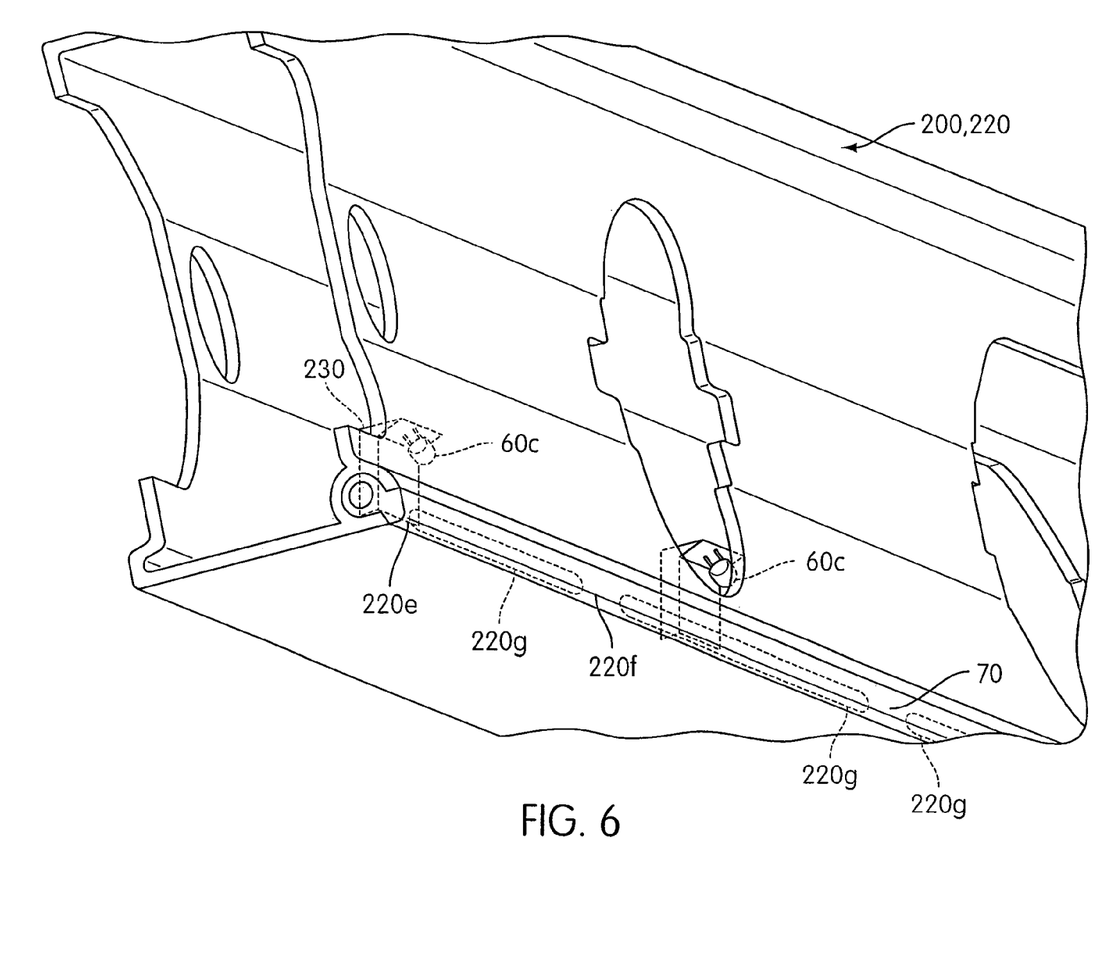
FIG. 6 is a perspective view of a portion of the level of FIG. 5.

FIGS. 5 and 6 illustrate a level 200 according to an alternative embodiment of the present invention. Because the level 200 is similar to the level 10 in many ways, a redundant description of overlapping features is omitted. The level 200 includes longitudinally-elongated, longitudinally-spaced slots 220g along the inner sides of the notch 220f. A plurality of longitudinally-spaced LEDs 60c are positioned within the body 220 via suitable support structures 230 (or the body itself) and aimed toward the slots 220g such that their light projects through the notch 220f and light guide 70 to create a light beam that illuminates a longitudinally-elongated area adjacent to the corner of the level 200. While the illustrated level 200 uses the LEDs 60c in conjunction with the LEDs 60a, the LEDs 60a may be omitted without deviating from the scope of the present invention.

While the level 200 makes the inner sides of the notch 220f optically transmissive (e.g., transparent, translucent) via slots 220g, such optical transmission from the inside of the level 200 through the notch 220f may alternatively result from any other suitable way of making the inner sides of the notch 220f optically transmissive (e.g., constructing all or part of the notch and surrounding portion of the body/frame from an optically transmissive material). If the frame 20a or other parts of the body 220 are optically transmissive, a reflective coating may be applied to the interior of such light transmissive parts other than along the corner 220e so as to limit or prevent light from escaping from places other than at the corner 220e. Indeed, such coatings or light guides within the body 220 may be used to focus/direct light to the corner 220e and light guide 70. Consequently, portions of the body 220 other than at the corner(s) 220e and bubble vials 30 may be opaque or mirrored to reduce or eliminate light transmission out of the body 220 other than at the desired locations. The light guide 70 provides improved light dispersion and a structural aspect to the corner 20e.

Alternatively, the light guide 70 may be omitted altogether from the level 200. If the light guide 70 is omitted, the notch 220f may also be omitted such that the optical transmission flows directly from optically transmissive portions of the body 20 along its corner(s) 220e (e.g., through longitudinally-elongated, longitudinally-spaced slots along the corner 220e).

While the illustrated light source 60 comprises a plurality of LEDs 60a, 60b, and/or 60c, one or more of these LEDs 60a, 60b, 60c may be omitted from the light source 60 without deviating from the scope of the present invention. While the illustrated light source 60 comprises one or more LEDs, one or more of these LEDs may be replaced with any other type of suitable light element (e.g., incandescent bulb, etc.). Moreover, while the illustrated light source 60 utilizes multiple LEDs to illuminate multiple areas, a single LED (or other light element) may illuminate a plurality of areas through the use of suitable light guides, fiber optic elements, etc., without deviating from the scope of the present invention. The part of the light source 60 used to illuminate the light guide 70 is preferably not a laser light source, as lasers typically do not have the light dispersion/divergence characteristics that would lend themselves to the desired illumination.

Figure 7:
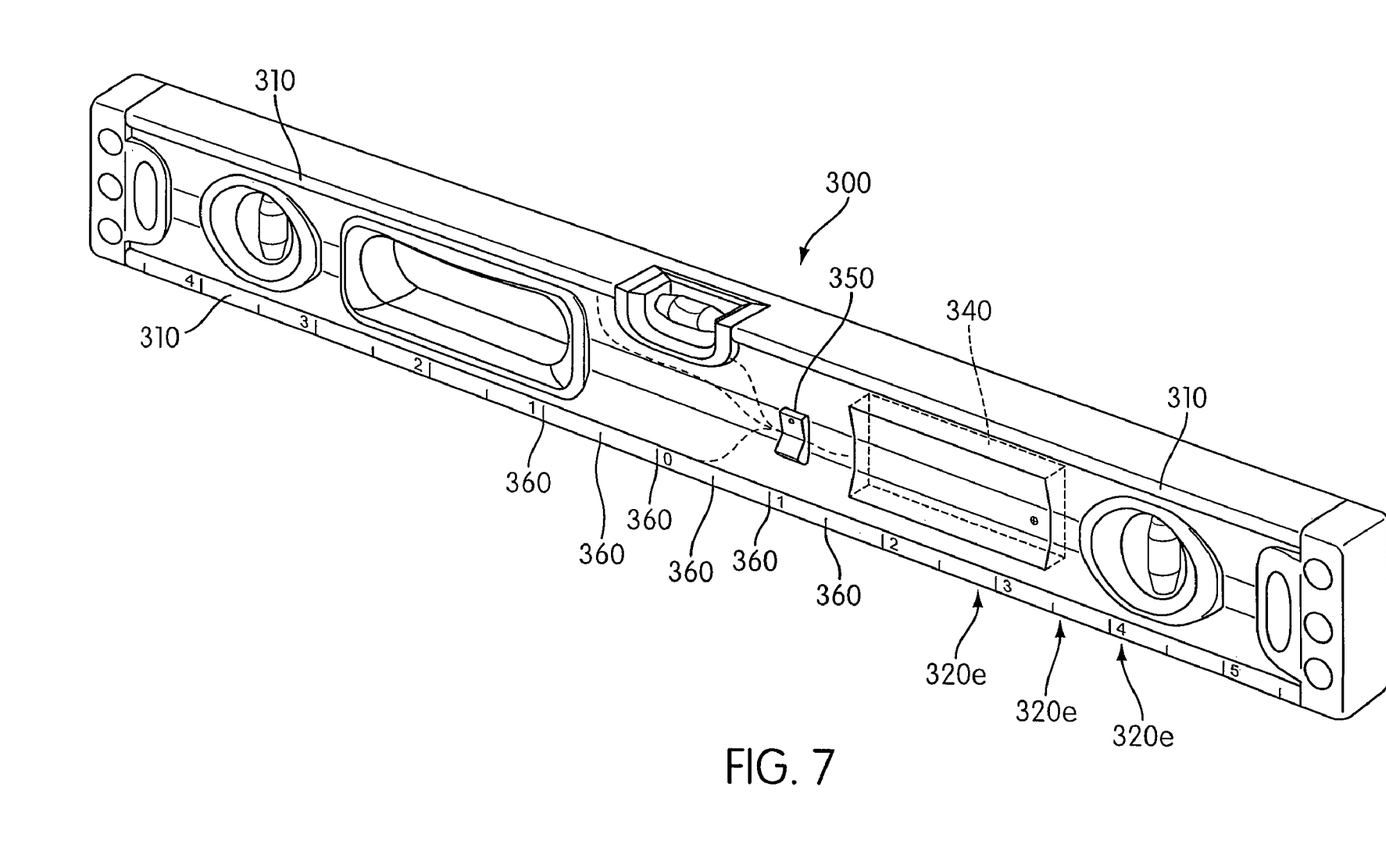
FIG. 7 is a perspective view of a level according to an alternative embodiment of the present invention.

FIG. 7 illustrates a level 300 according to an alternative embodiment of the present invention, which is generally similar to the level 10, except that the notch 20f, light guide 70 and LEDs 60a are replaced with a longitudinally-elongated electroluminescent film 310 (or other electroluminescent material) that is applied along a lower corner of the level 300 to create the light emitting region. The level 300 also includes an additional longitudinally-elongated electroluminescent film 310 that is applied along an upper, longitudinal corner of the level 300. The electroluminescent film 310 electrically connects to a switch 350 and battery holder 340 in generally the same manner as described above with respect to the connection of the switch 50 and battery holder 40 to the LEDs 60a, 60b. The level 300 may include suitable circuitry for powering the electroluminescent film 310, as is well known in the art. The electroluminescent film 310 may be coated with a protective coating (e.g., plastic, glass) to protect it against damage.

According to an alternative embodiment of the present invention that is similar to the level 10, the light guide 70 and LEDs 60a are replaced with an electroluminescent tube that is disposed in the notch 20f and extends along longitudinally along the level. The electroluminescent tube creates a light emitting region that generates a light beam like the light beam generated by the LEDs 60a and light guide 70 discussed above.

While a single corner 20e, 220e of the levels 10, 200 and a single adjacent area 100 are illuminated in the illustrated levels 10, 200, additional corners and/or areas adjacent thereto may additionally and/or alternatively be illuminated without deviating from the scope of the present invention, as is the case in the level 300. For example, in the case of a level with a generally rectangular cross-section (like the levels 10, 200), each of the four corners of the level (and the areas adjacent thereto) may be illuminated. In the level 200, specific LEDs 60c (or other types of lights) may have wide dispersion angles so as to illuminate multiple corners of the level.

Similarly, either side or both sides of the corners of the level may be illuminated. For example, in the embodiment shown in FIG. 7, illumination generally projects from the sides of the corners that are disposed on the larger sides of the rectangular shape of the level 300 (e.g., the front and back sides of the level as shown in FIG. 7). However, illumination could additionally and/or alternatively project from the other sides of the corners (e.g., the top and/or bottom surfaces of the level 300 as shown in FIG. 7).

As shown in FIG. 7, length measurement indicia in the form of light-absorbing ruler markings 360 and less light-absorbing or light emitting surrounding material is disposed on one of the longitudinally-elongated electroluminescent films 310. The ruler markings 360 include dashes of various sizes to indicate various lengths, and include appropriate numbering to assist in their use. This enables the ruler markings 360 to be used to measure lengths in dim/dark environments by energizing the underlying electroluminescent film 310. In the illustrated embodiment, the ruler markings are dark colored and are visible in dim/dark environments via their contrast to the surrounding light of the electroluminescent film 310, which itself forms length measurement indicia as a negative of the light-absorbing ruler markings 360. The ruler markings may be of any suitable scale (e.g., inches, cms, etc.) and have any suitable starting point (e.g., starting from zero at one end of the level 300; starting from zero at a center of the level and going positively in both directions).

While ruler markings 360 are shown with respect to the level 300, ruler markings 360 or other measurement indicia could be added to any of the other embodiments without deviating from the scope of the present invention. For example, a clear or light-permeable, light-colored sheet (e.g., plastic) with dark measurement indicia thereon could be placed over the light sources in other embodiments to provide illuminated measurement indicia for use in low light environments. Alternatively, the measurement indicia could comprise light-permeable holes/openings in a more light-impervious sheet so that the measurement indicia would be illuminated relative a darker surrounding.

Figure 8:
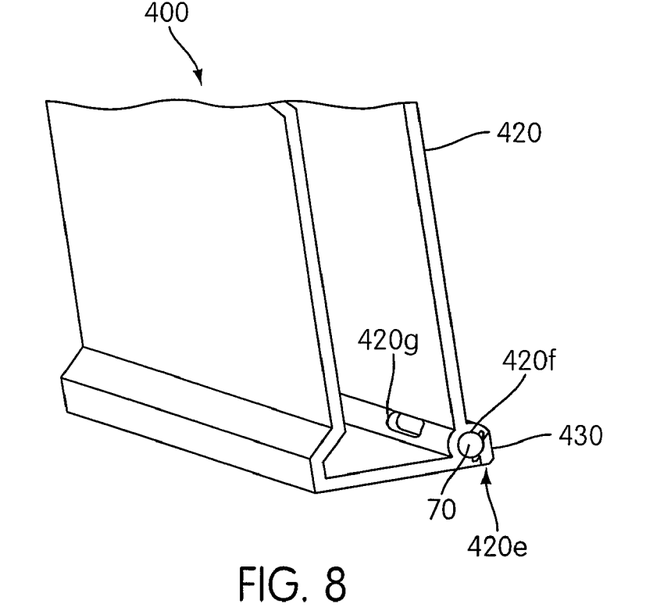
FIG. 8 is a perspective view of a portion of a level according to an alternative embodiment of the present invention.

FIG. 8 illustrates a level 400 according to an alternative embodiment of the present invention. The level 400 is similar to the level 10, but illuminates the bubble vials using the light guide 70 instead of (or in addition to) the LEDs 60b. Slots 420g are formed along inner portions of the notch 420f in the body 420 of the level 400. Each slot 420g is aligned with a corresponding bubble vial (such as those shown in FIG. 1) such that light projects from the light guide 70 through the slot 420g into the hollow body 20 and illuminates the bubble vial. The body 420 may include structures that tend to focus/direct such light toward the bubble vial (e.g., appropriately placed mirrors, reflective surfaces/tubes/channels, fiber optics, light guides, etc.).

The level 400 includes a light diffuser 430 disposed laterally outwardly from the light guide 70 to diffuse light emitted from the light guide 70. The light diffuser 430 extends over the entire length of the notch 420f, and may help to protect the light guide 70 from damage/wear. Such a light diffuser 430 may be added to other embodiments of the present invention without deviating from the scope of the present invention.

Figure 9:
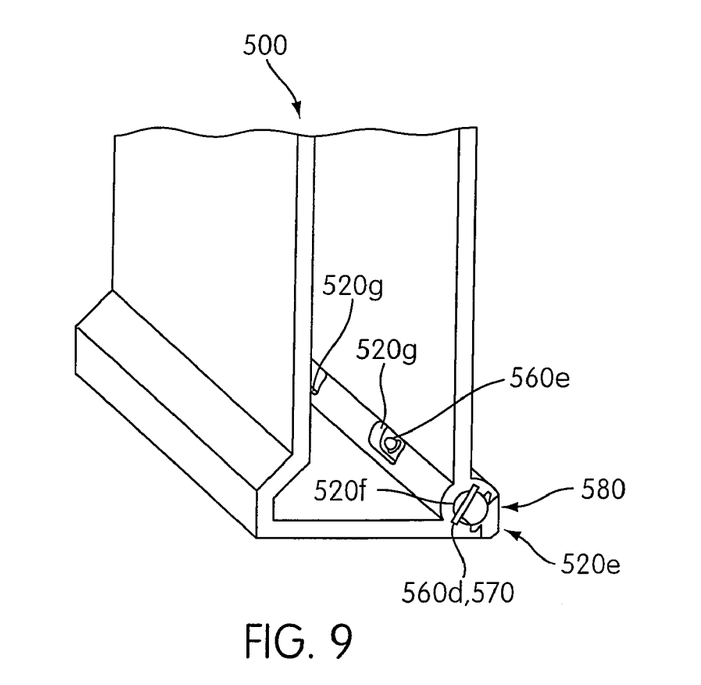
FIG. 9 is a perspective view of a portion of a level according to an alternative embodiment of the present invention.
Figure 10:
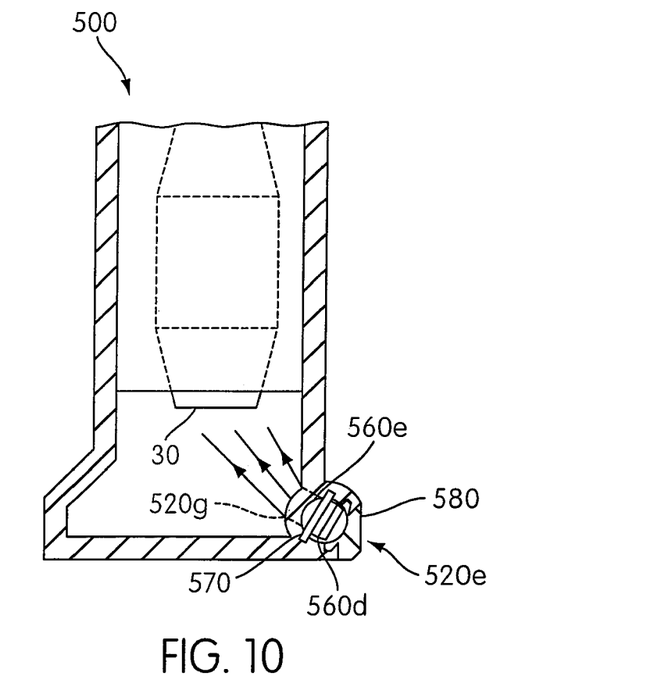
FIG. 10 is a cross-sectional end view of the level of FIG. 9.

FIGS. 9 and 10 illustrate a level 500 according to an alternative embodiment of the present invention. The level 500 is similar to the above levels 10, 200, 400, but utilizes strip-mounted LEDs 560d to create the light emitting region instead of the light guide 70 and LEDs 60a, 60c, and uses LEDs 560e to illuminate the bubble vials 30 instead of LEDs 60a, 60b. The strip-mounted LEDs 560d are disposed in the notch 520f. Each LED 560d may be longitudinally-spaced from adjacent LEDs 560d over the longitudinal length of the notch 520f (e.g., spacing between LEDs 560d of less than 3 inches, less than 2 inches, about two inches, etc. according to various embodiments of the invention). The LEDs 560d are mounted together onto one or more longitudinally-elongated strips 570 (e.g., one or more rigid or flexible printed circuit boards, rigid strips, flexible strips, SMD strip, SMD tube, etc.) that fit into the notch 520f. The LEDs 560d are aimed toward the lateral opening in the notch 520f to create the light emitting region. A light diffuser 580 is disposed in front of each LED 560d to longitudinally elongate and diffuse the light of the LEDs 560d. Depending on the spacing of the LEDs 560d and structure of the diffusers 580, the resulting light emitting region may be continuous (e.g., via overlapping light from adjacent LEDs 560d) or have longitudinally-spaced portions. According to one embodiment, the diffuser 580 is translucent and white so as to diffuse light.

Measurement indicia such as the ruler markings 360 shown in FIG. 7 may be added to the light diffuser 580 (or a film or additional sheet thereon) to provide measurement indicia such as ruler markings for use with the level 500 in low light environments. According to one embodiment, black measurement indicia is printed onto the white/translucent diffuser 580 so that the measurement indicia is easily usable in low light environments. The measurement indicia may be considered to be the ruler markings, themselves, and/or the surrounding white/translucent diffuser portions that provide a negative of the ruler markings 360.

As shown in FIGS. 9 and 10, LEDs 560e are mounted to the back of the strip(s) 570 and aligned with appropriately positioned slots 520g in the inner side of the notch 520f to illuminate the bubble vials 30. For example, as shown in FIG. 10, an LED 560e illuminates an internal end of a bubble vial 30 through a slot 520g in the inner side of the notch 520f.

Figure 11:
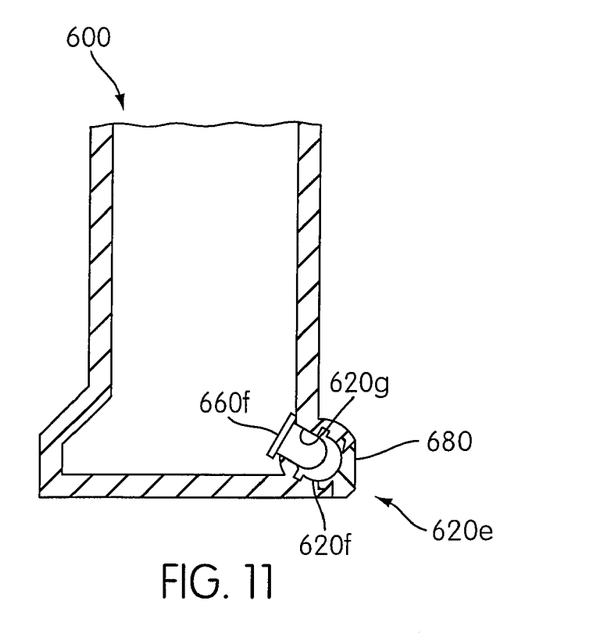
FIG. 11 is a cross-sectional end view of a level according to an alternative embodiment of the present invention.

FIG. 11 illustrates a level 600 according to an alternative embodiment of the present invention. The level 600 is similar to the level 500, except that the strip-mounted LEDs 560d are replaced with longitudinally spaced LEDs 660f that extend into the notch 620f via corresponding longitudinally-spaced holes 620g in the inner side of the notch 620f. The LEDs 660f may be mounted to each other via one or more strips like the strip 570. Rear-facing LEDs may mount to the strip to illuminate the bubble vials, as discussed above with respect to the LEDs 560e. Alternatively, the LEDs 660f may individually mount to their respective holes 620g. A light diffuser 680 diffuses light from the LEDs 660f in a similar manner as discussed above with respect to the light diffusers 430, 580.

In the illustrated levels 10, 200, 300, 400, 500, 600, the light sources (e.g., LEDs 60a, 60c, 560d, 660f; electroluminescent film 310) create longitudinally-elongated, light-emitting regions that extend along one or more of the corners 20e, 220e, 320e, 420e, 520e, 620e of the levels 10, 200, 300, 400, 500, 600. According to alternative embodiments of the present invention, such light-emitting regions may be spaced from the corners 20e, 220e, 320e, 420e, 520e, 620e without deviating from the scope of the invention. For example, the light emitting region may extend longitudinally along a middle of a side of the levels 10, 200, 300, 400, 500, 600 to illuminate longitudinally-elongated areas adjacent to both the upper and lower corners of the level. To facilitate such illumination, the light guide 70, LEDs 60a, 60c, 560d, 660f, electroluminescent film 310, diffusers 430, 580, 680, and/or other light guiding or creating structures may project laterally outwardly from a side of the level 10, 200, 300, 400, 500, 600 so as to create a straight light path from the light emitting region to the corners of the level 10, 200, 300, 400, 500, 600.

As shown in FIG. 3, to use the levels 10, 200, 300, 400, 500, 600 in a dimly lit environment, the user turns on the light source (e.g., LEDs 60a, 60c, 560d, 660f; electroluminescent film 310) via the switch 50, 350 and positions the reference surface 20d flushly against the surface 110 of the object 120 to be measured. The light source illuminates the area 100 immediately adjacent to the corner 20e, 220e, 320e, 420e, 520e, 620e of the level 10, 200, 300, 400, 500, 600 to facilitate appropriate placement and alignment of the level 10, 200, 300, 400, 500, 600 relative to the object 120. The user then determines the orientation of the surface 110 by examining the position of the bubbles in one or more of the illuminated bubble vials 30.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A hand-held level comprising:
   an elongated body having
      an opaque outer surface,
      an elongated discontinuity in the opaque outer surface, the discontinuity extending in the elongated direction of the body, the discontinuity forming an elongated light emitting region, and
      an elongated reference surface;
   an orientation indicator connected to the body, the orientation indicator being positioned to indicate an orientation of the reference surface; and
   a light source positioned within a boundary defined by the outer surface, the light source arranged to emit light from the body through the light emitting region, light being prevented from being emitted through the opaque outer surface; and
   wherein the body includes a corner adjacent the reference surface, and wherein the light emitting region extends longitudinally along the corner.

2. The level of claim 1, further comprising:
   a battery holder mounted to the body;
   an on/off switch mounted to the body and electrically connecting the battery holder to the light source,
   wherein the light source comprises at least one light emitting diode.

3. The level of claim 1, wherein the orientation indicator comprises at least one bubble vial, and wherein the light source is positioned to illuminate the at least one bubble vial.

4. The hand-held level of claim 1, wherein the light emitting region and discontinuity each extend longitudinally along at least 25% of a length of the level in the direction of elongation of the body.

5. The level of claim 4, wherein the level further comprises a longitudinally elongated light guide that extends along the light emitting region and covers at least a portion of the discontinuity, the light guide being positioned to disperse light from the light source such that light from the light source projects laterally away from the light guide over a longitudinally elongated portion of the level, and wherein the light source is positioned to direct light into a longitudinal end of the light guide.

6. The hand-held level of claim 1, wherein the light emitting region extends over at least 6 longitudinal inches of the level.

7. The level of claim 1, wherein:
the level further comprises an elongated optically transmissive structure that extends along the light emitting region and covers at least a portion of the discontinuity; and
the optically transmissive structure is positioned to permit light from the light source through the optically transmissive structure and through and out of the light emitting region.

8. The level of claim 7, wherein the light transmissive structure comprises a light guide that directs light through and out of the light emitting region.

9. The level of claim 7, wherein the light source and optically transmissive structure are positioned relative to each other so as to focus light emitted by the light source through the optically transmissive structure toward an elongated portion of a plane defined by the reference surface.

10. The level of claim 1, wherein the discontinuity comprises a recess in the outer surface or a hole in the outer surface.

11. The level of claim 1, wherein the body comprises an opaque frame that defines the reference surface and the opaque outer surface.

12. The level of claim 11, wherein the frame is a wood frame or a metal frame.

13. The level of claim 1, further comprising means for reducing light transmission from the light source out of the body other than at at least one desired location on the body, wherein the at least one desired location comprises the light emitting region.

14. The level of claim 1, wherein the body comprises a light shield that impedes light emitted through the light emitting region from projecting away from a plane defined by the reference surface.

15. A method of using a hand-held level, the level comprising an elongated body having an opaque outer surface, an elongated discontinuity in the opaque outer surface, the discontinuity extending in the elongated direction of the body, the discontinuity forming an elongated light emitting region, and an elongated reference surface, the method comprising:
disposing the reference surface of the level against a surface of an object;
projecting light from a light source positioned within a boundary defined by the outer surface through the light emitting region to an area of the surface of the object that is adjacent to the level, while preventing light from the light source from being emitted through the opaque outer surface; and
using an orientation indicator of the level to determine an orientation of the surface of the object.

16. The method of claim 15, wherein projecting the light comprises projecting the light through a longitudinally elongated light guide that extends along the light emitting region and covers at least a portion of the discontinuity such that the light guide disperses the light laterally away from the light guide to the area over a longitudinally extending portion of the level.

17. The method of claim 15, wherein projecting the light comprises projecting the light from a battery-powered light source mounted to the level.

18. The method of claim 15, wherein:
the level further comprises an elongated optically transmissive structure that extends along the light emitting region and covers at least a portion of the discontinuity; and
projecting the light comprises focusing the light through the optically transmissive structure toward an elongated portion of a plane defined by the reference surface.

19. The method of claim 15, further comprising using a light shield of the level to impede the projected light from projecting away from a plane defined by the reference surface.

20. A hand-held level comprising:
an elongated body having
an elongated opaque frame that defines a reference surface, and
an elongated light emitting region extending in the elongated direction of the body;
an orientation indicator connected to the body, the orientation indicator being positioned to indicate an orientation of the reference surface; and
a light source arranged to emit light from the body through the light emitting region to an area adjacent the reference surface, light being prevented from being emitted through the opaque outer surface.

21. A hand-held level comprising:
an elongated body having
an opaque outer surface,
an elongated discontinuity in the opaque outer surface, the discontinuity extending in the elongated direction of the body, the discontinuity forming an elongated light emitting region, and
an elongated reference surface;
an orientation indicator connected to the body, the orientation indicator being positioned to indicate an orientation of the reference surface;
a light source positioned within a boundary defined by the outer surface, the light source arranged to emit light from the body through the light emitting region, light being prevented from being emitted through the opaque outer surface; and
length measurement indicia, wherein the light source is positioned to illuminate the length measurement indicia.

* * * * *